United States Patent
Marchon et al.

(10) Patent No.: US 12,505,865 B1
(45) Date of Patent: Dec. 23, 2025

(54) DEVICES AND METHODS FOR GENERATING OXYGEN FROM RESIDUAL HUMIDITY WITHIN SEALED ENCLOSURES

(71) Applicant: Seagate Technology LLC, Fremont, CA (US)

(72) Inventors: Bruno Marchon, Minneapolis, MN (US); Rory S. Goodman, Longmont, CO (US); Dipeshkumar J. Purani, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 37 days.

(21) Appl. No.: 18/421,123

(22) Filed: Jan. 24, 2024

(51) Int. Cl.
*G11B 33/14* (2006.01)
*G11B 25/04* (2006.01)

(52) U.S. Cl.
CPC ........ *G11B 33/1453* (2013.01); *G11B 25/043* (2013.01)

(58) Field of Classification Search
None
See application file for complete search history.

(56) References Cited

U.S. PATENT DOCUMENTS

| | | | |
|---|---|---|---|
| 4,837,648 A * | 6/1989 | Yamauchi | G11B 33/1453 360/235.4 |
| 8,279,552 B2 | 10/2012 | Stipe | |
| 8,693,135 B2 * | 4/2014 | Brown | G11B 33/1453 360/97.12 |
| 10,593,372 B2 * | 3/2020 | Yap et al. | G11B 33/1453 |
| 10,734,035 B1 * | 8/2020 | Sun et al. | G11B 33/1453 |
| 11,024,343 B2 * | 6/2021 | Luebben et al. | G11B 33/022 |
| 2006/0066974 A1 | 3/2006 | Akamatsu et al. | |
| 2025/0104741 A1 * | 3/2025 | Zaima et al. | G11B 33/1453 |

OTHER PUBLICATIONS

Billeter et al., "Surface Properties of the Hydrogen-Titanium System", *J. Phys. Chem*, C Nov. 9, 2021, 125, pp. 25339-25349.
Li et al., "Durability analysis and degradation mechanism for an electrolytic air dehumidifier based on PEM", *International Journal of Hydrogen Energy*, 45, Jan. 1, 2020, pp. 3971-3985.
Wang, "Measurements and Modeling of Water Adsorption Isotherms of Zeolite Linde-Type A Crystals", *I&EC Research*, Apr. 6, 2020, 11 pages.

* cited by examiner

*Primary Examiner* — Craig A. Renner
(74) *Attorney, Agent, or Firm* — Mueting Raasch Group

(57) ABSTRACT

Provided are devices, and methods for use with devices, that generate oxygen from residual humidity within a sealed enclosure that is filled primarily with an inert gas. A PEM electrolyzer that is configured to generate oxygen from residual humidity is situated within the sealed enclosure. The PEM electrolyzer includes a PE membrane disposed between an anode and a cathode, and further includes a hydrogen getter. The hydrogen getter helps the PEM electrolyzer to be a net producer of oxygen. Exemplary sealed enclosure devices include hard disk drives such as HAMR hard drives filled primarily with helium.

11 Claims, 4 Drawing Sheets

DEVICES AND METHODS FOR GENERATING OXYGEN FROM RESIDUAL HUMIDITY WITHIN SEALED ENCLOSURES

The disclosure relates to removing residual humidity from devices having sealed enclosures, such as heat assisted magnetic recording hard disk drives.

BACKGROUND

Storage density in hard disk drives (HDD) continues to increase. Areal density in shipped products exceeds one terabit per square inch, with densities approaching 5 terabit per square inch being possible in the near future. As a result, there is constant need to develop technologies relating to magnetic disks and recording heads that can sustain a recorded bit size approaching 10 to 20 nanometers in size. Heat Assisted Magnetic Recording (HAMR) technology allows for increased bit stability in the nanoscopic domain, but integrating HAMR technology into hard drives can be challenging.

SUMMARY

In accordance with certain aspects, the present disclosure describes devices that include a sealed enclosure filled primarily with an inert gas and a PEM electrolyzer configured to generate oxygen from residual humidity within the sealed enclosure. The PEM electrolyzer includes a PE membrane disposed between an anode and a cathode, and further includes a hydrogen getter. Exemplary sealed enclosure devices include hard disk drives such as HAMR hard drives filled primarily with helium. In certain embodiments, the devices may include an absorbent desiccant or molecular sieve that functions to reduce but not eliminate humidity within the sealed enclosure.

In certain aspects, the hydrogen getter is hermetically placed on the cathode or on the PE membrane proximate the cathode.

In certain aspects, the hydrogen getter includes titanium, palladium, vanadium, or zirconium.

In certain aspects, the PE membrane is a fluoropolymer film.

In certain aspects, the sealed enclosure is filled with a gas mixture that includes helium present in an amount of about 90% to 99% by volume and oxygen present in an amount of about 1% to 10% by volume. In some embodiments the gas mixture further includes nitrogen.

In certain aspects, devices in accordance with the present disclosure include a humidity sensor or an oxygen sensor, and may also include a controller configured to use input signals from the humidity sensor or oxygen sensor to control a voltage supplied to the PEM electrolyzer.

In accordance with certain aspects, the present disclosure further describes methods of generating oxygen from residual humidity in a sealed enclosure device that is filled primarily with an inert gas. Such methods include removing residual humidity within the sealed enclosure using a PEM electrolyzer to convert water into oxygen and hydrogen, and mitigating recombination of the oxygen and hydrogen produced in the removing step by using a hydrogen getter disposed within the PEM electrolyzer.

In certain aspects, a voltage applied to the PEM electrolyzer is controlled to thereby maintain a level of relative humidity at or below a selected threshold RH level or to maintain a level of oxygen at or above a selected threshold oxygen level.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

The present disclosure relates to reducing residual humidity inside a sealed enclosure, such as the enclosure of a hard disk drive (HDD), in a manner that supports the maintenance of an oxygen atmosphere inside enclosure. In various aspects of the present disclosure, proton exchange membrane (PEM) electrolysis is used to convert water present in the enclosure into hydrogen and oxygen. In addition to proton exchange membrane, PEM can refer to polymer electrolyte membrane, and therefore the use of PEM throughout the present disclosure will be generic to both terms unless the context dictates that only one or the other applies. PEM electrolysis can be performed using a PEM electrolyzer. In various aspects, the PEM electrolyzer can include a hydrogen getter that reacts with the hydrogen produced by the PEM electrolyzer cell, thereby trapping hydrogen and preventing it from recombining with oxygen. This both prevents the reformation of water as well as adds oxygen to the environment inside the enclosure.

In certain sealed enclosure applications such as HDDs, and in particular heat-assisted magnetic recording (HAMR) hard drives, it is beneficial to retain an amount of oxygen in the enclosure to be available for mitigation of the effects of carbonaceous residue formation, thereby extending the useful life of the HAMR drive. In HAMR drives, the surface of the recording media is elevated up to 500 degrees C. or more during writing. Without wishing to be bound by any theory, it has been observed that organic residues present at the HAMR head-disk interface can act as optical absorbers of near-field infrared light and thereby interfere with optimal HAMR drive operations. These organic residues, also referred to as carbonaceous residues or "smear," are believed to originate from mechanisms such as thermal decomposition of volatile organic compounds within the drive enclosure as well as other mechanisms involving carbon-containing materials including overcoats and lubricants inside the enclosure. The deleterious effects of these organic residues have been found to be effectively mitigated when oxygen is allowed to react with the organic residues.

Figure 4:
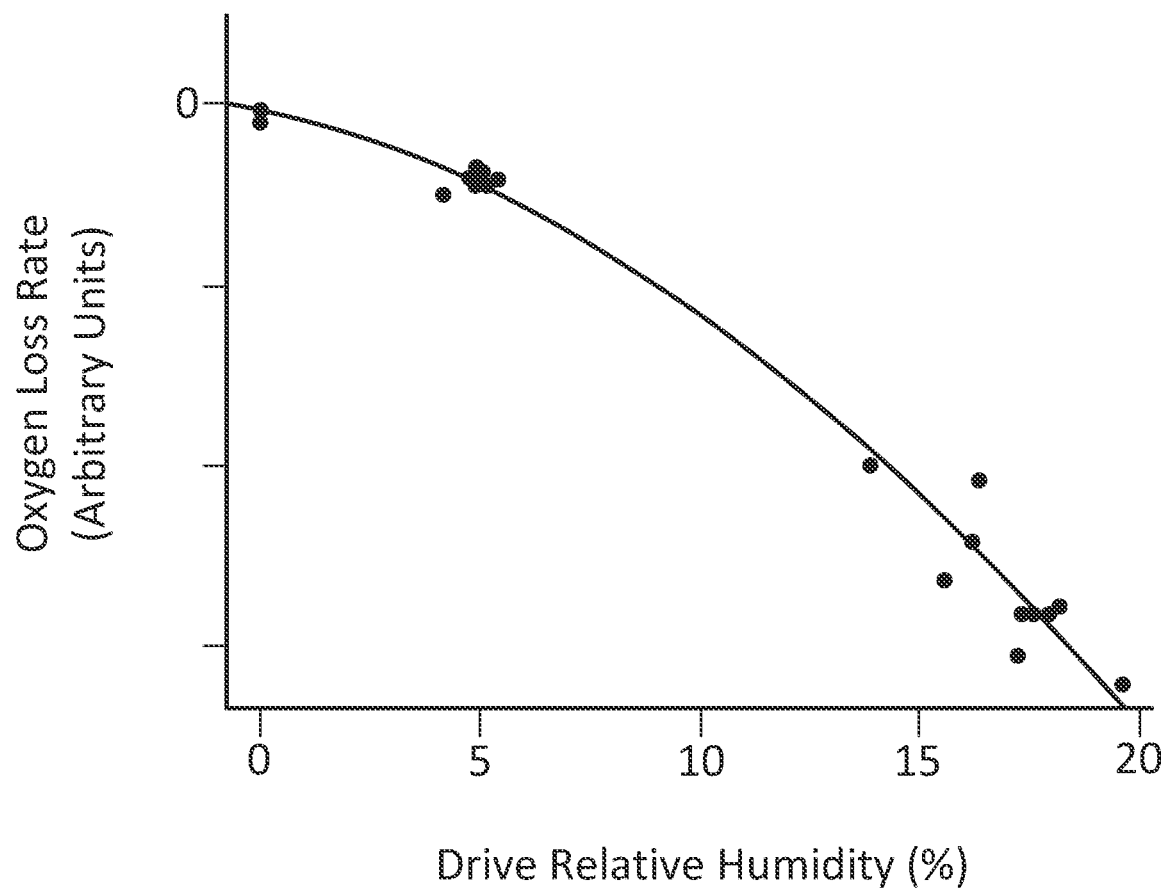
FIG. 4 is a plot of data showing the dependence of initial rate of oxygen depletion versus relative humidity within a sealed hard disk drive enclosure.

When filling sealed HDDs, typically an inert gas is used such as helium. A small percentage of oxygen can be included along with helium, or another inert gas, to fill the sealed drive environment, thereby providing residual oxygen to mitigate effects of organic residues. However, it can be observed that oxygen is slowly scavenged in the sealed drive enclosure, for example due to oxidation reactions with various materials in the drive including epoxy coatings and various metals. It has also been observed that the rate of oxygen loss depends on the residual humidity level in the drive enclosure. For example, as can be seen in FIG. 4 in which the initial rate of oxygen depletion is plotted against the relative humidity in a sealed HDD enclosure, residual humidity is a contributor to oxygen loss. These observations also indicate that the complete, or near complete, elimination of humidity in the drive enclosure would result in effective mitigation of the oxygen depletion problem over an expected lifetime of an HDD under normal operating conditions.

Addressing humidity management in a disk drive enclosure has generally involved the use of commercial absorbent desiccant solutions such as silica gels or molecular sieves, which can effectively lower and control humidity in the disk drive to about 1% to 5%. As appreciated in the methods and devices described in the present disclosure, reducing residual humidity beyond these levels, or fully eliminating residual humidity altogether, can be a much more challenging endeavor, since various components within an HDD are made of materials such as plastics that contribute some level of humidity that even the strongest desiccants (such as zeolites or phosphorus pentoxide) cannot completely remove.

As such, the presence of water in the form of humidity inside the hard drive assembly (HDA) has been shown to dramatically accelerate oxygen depletion inside a sealed HDA. In accordance with the present disclosure, PEM electrolysis can be used as a means of removing water in situ, while producing oxygen in amounts sufficient to support long term reliability.

In accordance with various aspects, an electrochemical cell (which without loss of generality is referred to herein as a PEM electrolyzer) is used to electrolyze water ($H_2O$) to form molecular oxygen ($O_2$), and in certain embodiments a hydrogen getter film can be used to capture hydrogen produced by electrolysis by forming metal hydrides (e.g., $TiH_2$) and related nonstoichiometric materials. The consumption of hydrogen using a hydrogen getter counteracts the accumulation of undesirable hydrogen in the drive enclosure. In the water electrolysis process, the PEM electrolyzer also functions to produce oxygen, which helps maintain sufficient oxygen levels in the enclosure.

As is known, electrochemical desiccation utilizes a polymer electrolyte membrane (referred to herein as a PEM or a PE membrane) that, on the anodic part, converts water to oxygen while protons are allowed to migrate to the cathode where they recombine with oxygen to produce water. Such a process in effect drives water from the humid side of the membrane to the dry side, where it can be flushed away. At equilibrium, RH levels on both sides of the membrane are equal, allowing this technique to possibly attain extremely low RH levels. However, such electrochemical desiccation technology necessitates the use of an extremely dry air flow, which is impractical for implementation inside a disk drive. It would also require that a PE membrane be placed at an opening in the HDD enclosure, which would not allow the drive to be hermetically sealed to maintain a helium (or other inert gas) environment.

In accordance with the present disclosure, an approach that is compatible with sealed enclosure HDDs is to prevent formation of water on the cathodic side, and to force the production of hydrogen instead. This occurs by removing the availability of oxygen in the vicinity of the cathode. Moreover, a hydrogen getter film may be placed on or near the cathode to strongly adsorb the hydrogen and to prevent hydrogen from recombining with oxygen at the cathode surface. Suitable hydrogen getters typically include metals that form strong hydrides, for example palladium, vanadium, zirconium or titanium, with titanium often preferred for cost reasons. These are all commercially available. In certain embodiments, a hydrogen getter can be provided as a separate film or can be deposited directly onto a surface of the cathode (for example using vacuum deposition tools such as direct evaporation, sputtering, or ion-beam deposition). In addition or alternatively, a hydrogen getter can be disposed or deposited directly onto the PE membrane.

Without wishing to be bound by any theory, certain materials that may be referred to as hydrogen getters in the present disclosure may function primarily as hydrogen diffusers and oxygen blockers rather than getters. For example, palladium may function in this way. PEM electrolyzers that include hydrogen diffusers that block oxygen can still be used to generate oxygen in the sealed enclosure, potentially also increasing hydrogen in the process, which need not be detrimental at low levels.

While methods and devices of the present disclosure may be advantageously utilized in applications such as sealed enclosure HDDs (specifically HAMR drives), it will be appreciated that they could also be used in any other application in which an extremely low humidity is desired within a sealed enclosure. Lithium-based battery fabrication, for instance, necessitates extremely low humidity levels (<0.5%) and could benefit from methods and devices in accordance with the present disclosure.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding, and are not meant to be scale drawings that accurately represent size or shape of elements. Likewise, the use of charts is meant to elucidate selected physical and optical behaviors without being bound to exactitude or to any theory.

Figure 1:
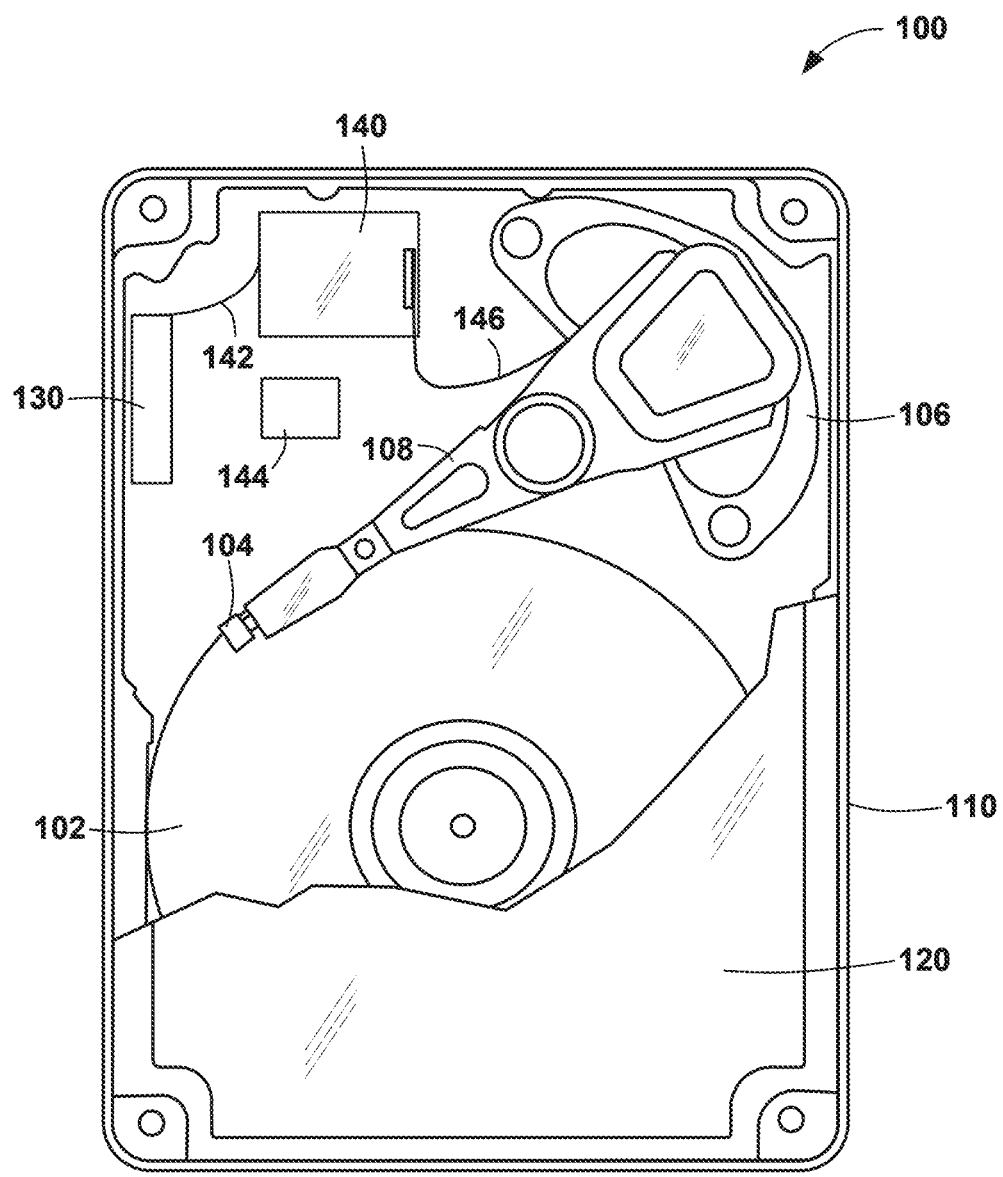
FIG. 1 is a schematic depiction of the sealed enclosure hard disk drive that includes a PEM electrolyzer in accordance with various aspects of the present disclosure.

FIG. 1 schematically shows a sealed enclosure hard drive 100, for example a HAMR hard drive that is filled primarily with an inert gas and sealed. Enclosure 110 includes a top cover 120 that is cut away to indicate various internal components. The sealed enclosure 110 contains magnetic recording media 102 in the form of one or more disks, a recording head (or slider on which a recording head is mounted) 104 including components to write data to and read data from the media 102, and an actuator arm 108 on the end of which is the recording head 104. The movement of the actuator arm 108 is controlled by a voice coil motor (VCM) 106. A controller 140 can be used to control the operation of the VCM and to send and receive data signals to and from the recording head, typically through a preamp (not shown).

Hard drive 100 further includes a PEM electrolyzer 130 that can be used to reduce residual humidity in the enclosure 110, and in certain embodiments to produce small amounts of oxygen. The power supply for controller 140 can also be used to provide power to the PEM electrolyzer 130, for example via connection 142. Moreover, controller 140 may be used to control the voltage supplied to PEM electrolyzer 130 based on sensing and maintaining desired levels of relative humidity and/or oxygen in the drive enclosure 110 (sensors for detecting oxygen and humidity levels are not indicated). For example, it may be preferable to maintain relative humidity at or below 2%, more preferably at or below 1%, even more preferably at or below 0.5%. It may be preferable to maintain gaseous oxygen in the enclosure in an amount of at least 0.2% by volume, and more preferably at least 0.5% by volume. The location and orientation of PEM electrolyzer 130 within the enclosure 110 is not critical for water removal and oxygen generation functionality, and therefore the PEM electrolyzer 130 can be placed based on other factors such as where there is sufficient room or close to where there is a source of power. For example, the electrolyzer could be placed directly on the flex cable 146, near the voice coil motor that controls the movement of the actuator, or near the spindle motor that controls the spinning of the magnetic media disks.

When filling the sealed enclosure 110 of hard drive 100 in accordance with aspects of the present disclosure, a mixture can be used that includes gaseous oxygen added to an inert gas such as helium so that oxygen is available to help mitigate effects of carbonaceous residue within the drive. However, adding more oxygen in the filling mixture can have the effect of increasing disk flutter. As such, the inclusion of a PEM electrolyzer that produces oxygen can allow the initial oxygen content of the filling mixture to be low enough to maintain desired drive operation while still sufficient to provide the benefit of carbonaceous reside mitigation without the concern of oxygen depletion being too rapid because the PEM electrolyzer can remove the residual humidity while in certain embodiments producing oxygen. For example, the gas mixture used to fill the enclosure can include helium in an amount of about 90% to 99% by volume, and oxygen in an amount of about 1% to 10% by volume. In certain embodiments, small amounts of other gasses, such as nitrogen, may also be added.

Figure 2:
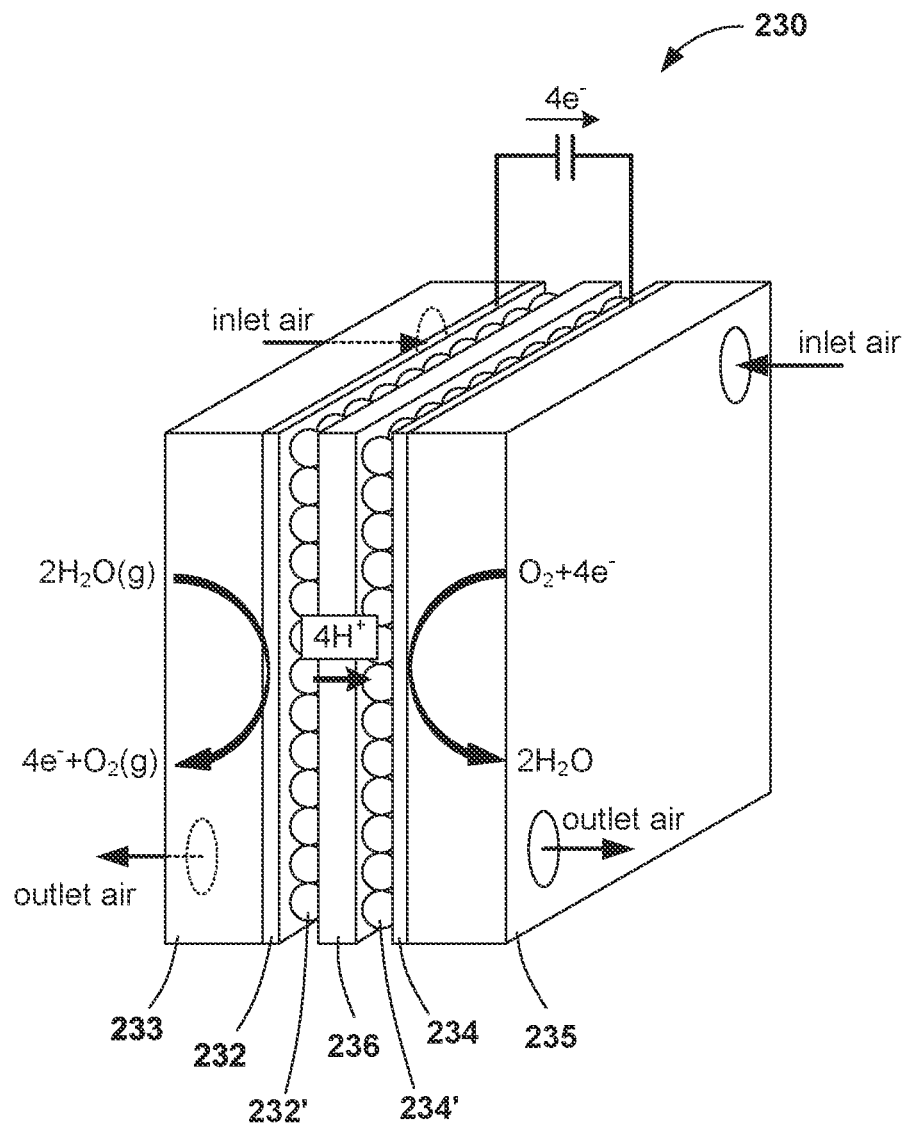
FIG. 2 is a schematic depiction of a PEM electrolyzer for use in accordance with various aspects of the present disclosure.

FIG. 2 schematically depicts a PEM electrolyzer 230 that may be useful in accordance with the present disclosure. The construction of PEM electrolyzers, hydrogen fuel cells, and other similar electrolysis devices, is well-known and so the electrolyzer 230 shown in FIG. 2 is meant to be illustrative without the loss of generality, and understanding that those of skill in the art will appreciate how to construct such devices. As indicated, electrolyzer 230 includes a PE membrane 236 disposed between an anode 232 and a cathode 234. Gas diffusion layers 233 and 235 are disposed adjacent to anode 232 and cathode 235, respectively. As illustrated, provisions are made to allow air to flow into and out of electrolyzer 230 via the gas diffusion layers 233 and 235. Optionally and depending on the construction and application, a first catalyst layer 232' can be disposed between the anode 232 and the PE membrane 236, and a second catalyst layer 234' can be disposed between the cathode 234 and the PE membrane 236. By applying a voltage across the anode 232 and cathode 234, water is converted into hydrogen and oxygen under the electrochemical reactions indicated in FIG. 2. Catalyst layers, if used, can be selected to catalyze the respective reactions indicated.

The PE membrane 236, which may be a solid polymer electrolyte for example, is a semipermeable membrane that conducts protons from the anode to the cathode while insulating the electrodes electrically and acting as a reactant barrier to recombination of oxygen and hydrogen. One of the most common and commercially available PE membrane materials is a sulfonated tetrafluoroethylene based fluoropolymer available from DuPont under the tradename Nafion.

The open circuit voltage of an operating electrolyzer such as shown in FIG. 2 will vary with application and the cell construction, but is typically in the range of 1 to 5 V. The half reaction taking place on the anode side of a PEM electrolyzer is commonly referred to as the oxygen evolution reaction, in which the water reactant supplied to a catalyst is oxidized to form oxygen, protons (hydrogen ions), and electrons. The half reaction taking place on the cathode side of a PEM electrolyzer is commonly referred to as the hydrogen evolution reaction, in which the supplied electrons and the protons that have conducted through the PE membrane are combined to create gaseous hydrogen.

The rate of humidity removal and oxygen production in PEM electrolyzers in accordance with the present disclosure is determined by the membrane voltage. In certain embodiments, a real-time control system can be employed to control the membrane voltage to maintain a desired relative humidity and/or oxygen content within the enclosure.

Figure 3:
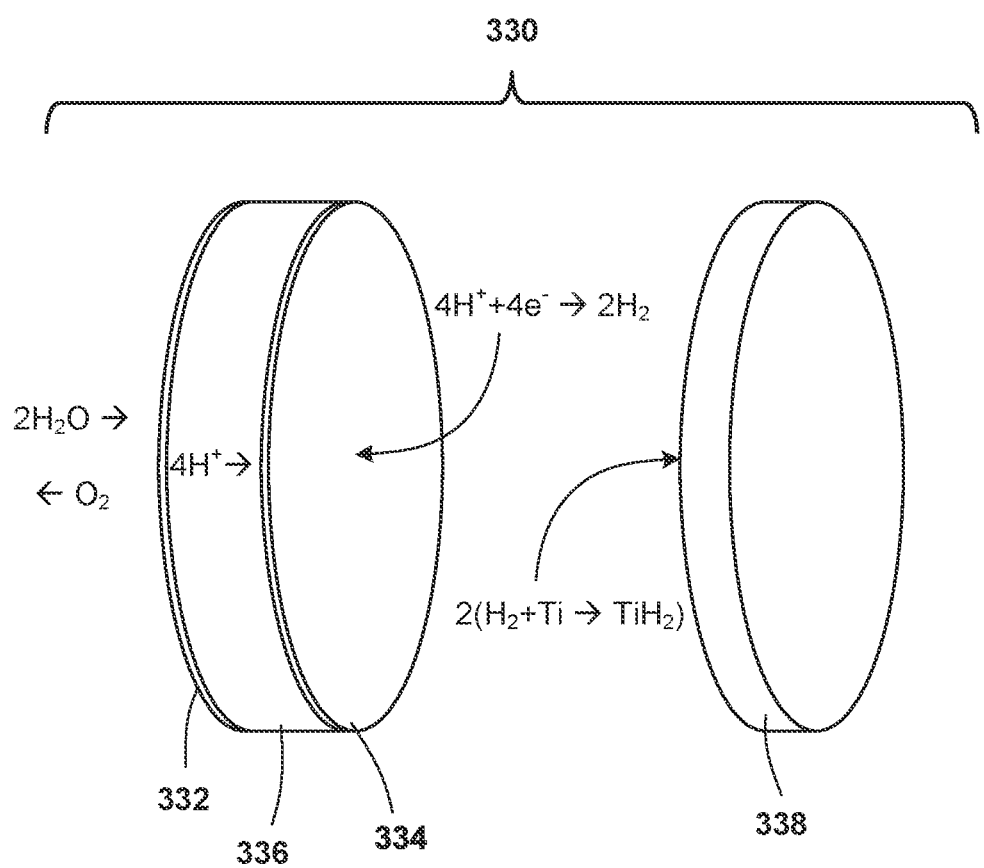
FIG. 3 schematically illustrates the inclusion of a hydrogen getter in the construction of a PEM electrolyzer in accordance with various aspects of the present disclosure.

FIG. 3 schematically depicts the integration of a hydrogen getter 338 as a component in a PEM electrolyzer 330 in accordance with certain aspects of the present disclosure. As shown, a PE membrane 336 is disposed between an anode 332 and a cathode 334, and a hydrogen getter 338 can be disposed on or adjacent to the cathode surface 334. In the exploded view of FIG. 3, hydrogen getter 338 is shown separated from cathode 334 in order to illustrate the reactions taking place between the elements shown. However, in practice hydrogen getter 338 is close to or contacting the surface of cathode 334.

Hydrogen getter 338 can be a stand-alone film (for example titanium deposited on a carrier substrate) that is placed on or next to cathode 334, or may be formed directly onto cathode 334, for example by vacuum deposition (sputtering, evaporation, ion-beam, etc.). Taken together, anode 332, membrane 336, cathode 334, and hydrogen getter 338 form the functional part of electrolyzer 330 that is involved in the cathodic reaction producing hydrogen gas and then capturing at least some of that hydrogen gas at the hydrogen getter 338, as indicated by the reactions shown in FIG. 3.

In certain embodiments, a hydrogen getter may be provided between the PE membrane 336 and cathode 334. For example, in FIG. 3 cathode 334 may be disposed on the right-hand side of getter 338, with getter 338 directly contacting the membrane 336.

Preferably, hydrogen getter 338 is hermetically placed on cathode 334 (or PE membrane 336), meaning their surfaces are preferably disposed tightly together without a gap. As discussed previously, the presence of the hydrogen getter 338 in close proximity to where the PEM electrolyzer produces gaseous hydrogen allows the hydrogen getter 338 to capture hydrogen, thereby inhibiting recombination of hydrogen with oxygen at the cathode surface, resulting in net oxygen production by the PEM electrolyzer. Suitable hydrogen getter materials include hydride-forming metals such as titanium, palladium, vanadium, and zirconium.

Oxygen depletion was measured as a function of relative humidity within a sealed HDD enclosure (such as enclosure 110 in FIG. 1) filled with helium and a small amount of oxygen to simulate a commercial helium filled HAMR drive. FIG. 4 plots the data as initial rate of oxygen depletion versus relative humidity. These results indicate that humidity contributes to oxygen loss, and that removing residual humidity below the 1% to 5% RH level achievable using water absorbing desiccants (such as desiccant 144 in FIG. 1) alone can significantly reduce or eliminate oxygen depletion.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality. For example, a controller may be operably coupled to a resistive heating element to allow the controller to provide an electrical current to the heating element.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A hard drive device comprising:
   a sealed enclosure housing operational components of the hard drive device, the sealed enclosure filled primarily with an inert gas; and
   a PEM electrolyzer configured to produce oxygen from residual humidity within the sealed enclosure, the PEM electrolyzer comprising a PE membrane disposed between an anode and a cathode, and including a hydrogen getter.

2. The hard drive device of claim 1, further comprising an absorbent desiccant within the sealed enclosure.

3. The hard drive device of claim 2, wherein the desiccant comprises a silica gel, a molecular sieve, a zeolite material, or a phosphorus pentoxide material.

4. The hard drive device of claim 1, wherein the hydrogen getter is hermetically placed on the cathode.

5. The hard drive device of claim 1, wherein the hydrogen getter is hermetically placed on the PE membrane.

6. The hard drive device of claim 1, wherein the hydrogen getter comprises titanium, palladium, vanadium, or zirconium.

7. The hard drive device of claim 1, wherein the PE membrane comprises a fluoropolymer film.

8. The hard drive device of claim 1, wherein the sealed enclosure is primarily filled with helium.

9. The hard drive device of claim 1, wherein the sealed enclosure is filled with a gas mixture that includes helium present in an amount of about 90% to 99% by volume and oxygen present in an amount of about 1% to 10% by volume.

10. The hard drive device of claim 9, wherein the gas mixture further includes nitrogen.

11. The hard drive device of claim 1, further comprising a controller configured to use input signals from a humidity sensor or an oxygen sensor to control a voltage supplied to the PEM electrolyzer.

* * * * *